United States Patent [19]

Lannie et al.

[11] Patent Number: 5,193,631

[45] Date of Patent: Mar. 16, 1993

[54] WEIGHING SCALES

[75] Inventors: Michael G. Lannie, Kibworth Beauchamp; Lewis W. Horton, Denbigh, both of Great Britain

[73] Assignee: Invicta Plastics Ltd, Leicester, England

[21] Appl. No.: 698,121

[22] Filed: May 10, 1991

[30] Foreign Application Priority Data

May 11, 1990 [GB] United Kingdom ............... 9010610
Mar. 26, 1991 [GB] United Kingdom ............... 9106436

[51] Int. Cl.⁵ ...................... G01G 5/04; G01G 23/38
[52] U.S. Cl. .................................. 177/208; 177/254; 177/10
[58] Field of Search .................... 177/208, 254, 10

[56] References Cited

U.S. PATENT DOCUMENTS

| | | |
|---|---|---|
| 2,795,410 | 6/1957 | Reynard ............................ 177/208 |
| 3,164,218 | 1/1965 | McClimon ......................... 177/208 |
| 3,465,838 | 9/1969 | Kienzle et al. .................... 177/208 |
| 3,472,328 | 10/1969 | Holman ............................. 177/208 |
| 3,658,142 | 4/1972 | Marshall et al. .................. 177/208 |
| 3,658,143 | 4/1972 | Schwartz ........................... 177/208 |
| 4,002,216 | 1/1977 | Solow ................................ 177/208 |
| 4,775,019 | 10/1988 | Schenter et al. .................. 177/208 |
| 4,844,189 | 7/1989 | Shisgal et al. ................. 177/208 X |
| 4,852,675 | 8/1989 | Wang ................................. 177/208 |

Primary Examiner—George H. Miller, Jr.
Attorney, Agent, or Firm—Longacre & White

[57] ABSTRACT

Weighing scales for use as a teaching aid in educational establishments. The scales include a platform adapted to receive an article to be weighed, a compressible, fluid-containing reservoir, in the form of bellows or diaphragm provided with a fixed wall. The scales are provided with display means which are in fluid communication with the reservoir. The display means is a transparent flexible tube adapted to display the volume of fluid displaced in response to the article being placed upon the platform.

3 Claims, 4 Drawing Sheets

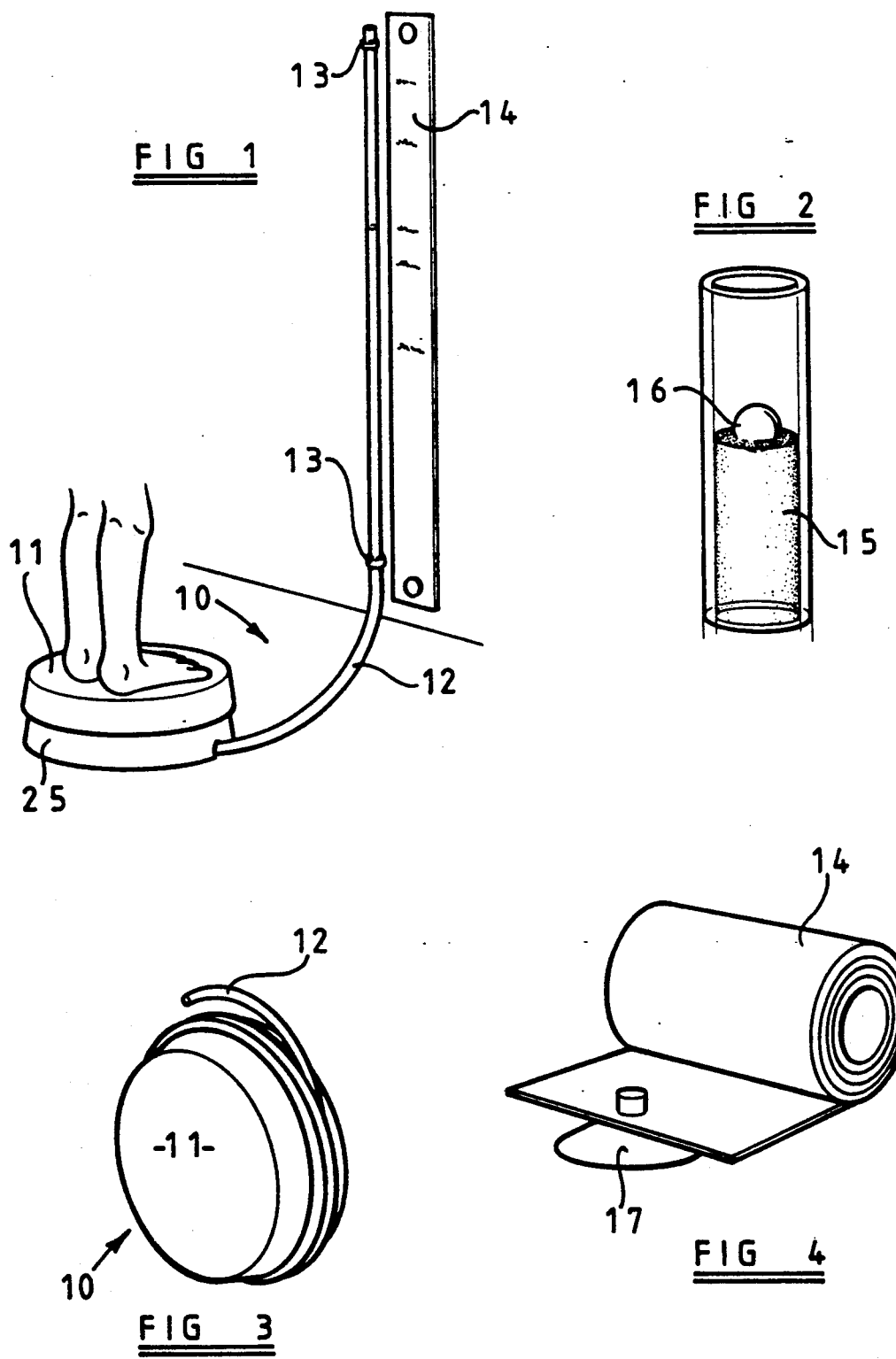

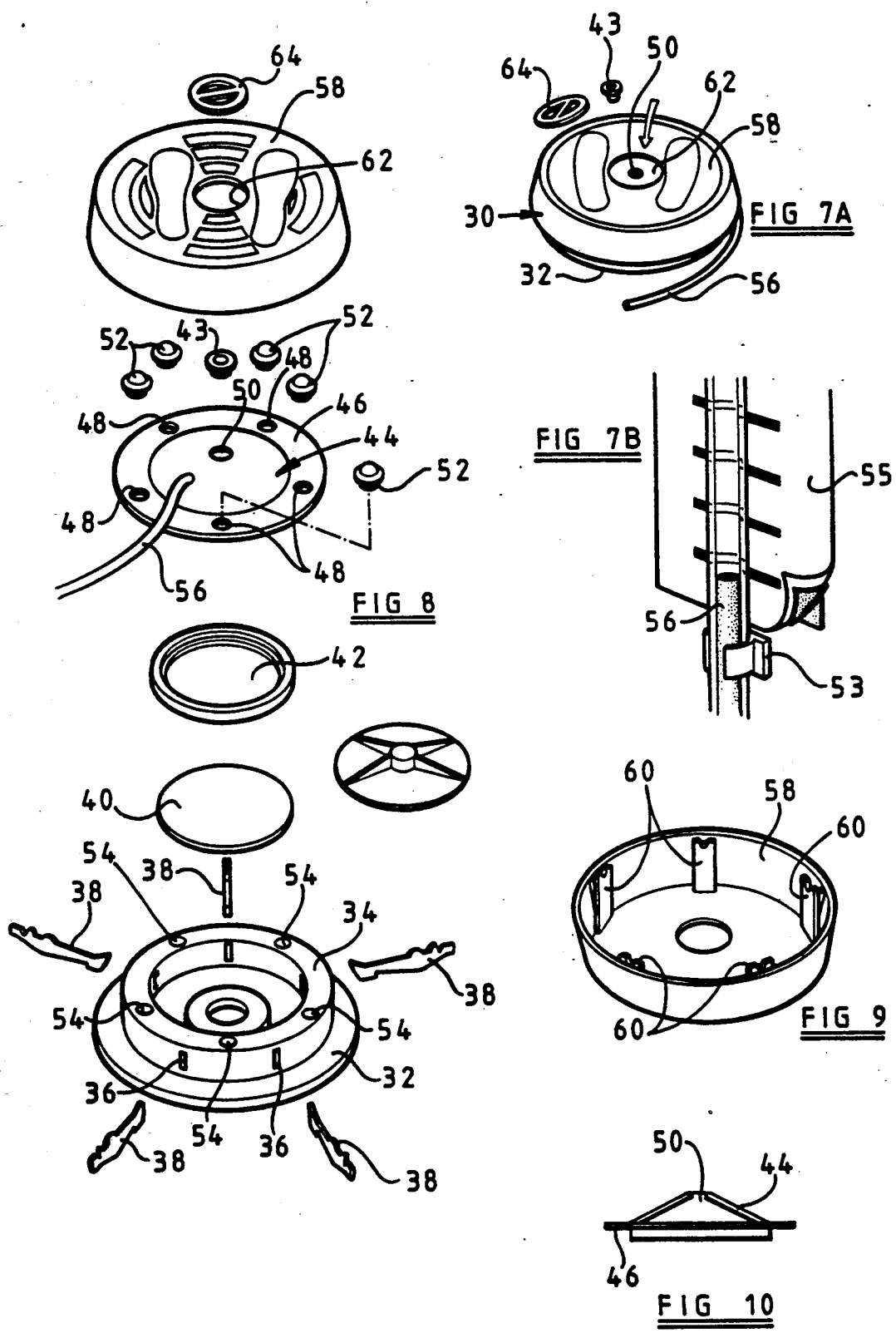

WEIGHING SCALES

The present invention relates to weighing scales, and in particular but not exclusively to scales for use as a teaching aid in educational establishments.

BACKGROUND OF THE INVENTION

Conventionally, weighing scales are constructed by use of a platform and a compression spring whereby when a person to be weighed stands on the platform, the spring is compressed and in turn operates a pointer on a dial so as to indicate the measured weight. This compression spring system can be used in conjunction with a digital display, but in both cases they are ineffective for demonstration purposes in educational establishments. This is because they do not provide a visual representation of the effect of a weight on the scales.

The present invention seeks to eliminate the problems outlined above by providing scales which are more suited to the above-mentioned use by virtue of the incorporation of an easily visible display effect showing clearly the effect resulting from a weight being placed on the scales.

BRIEF SUMMARY OF THE INVENTION

This invention employs a base, preferably a cylindrical base, and a platform which is mounted on the base for movement relative to said base. The platform is capable of receiving an article which is to be weighed. Beneath that platform and within the base there is a compressible reservoir for containing fluid. This reservoir may be in the form of bellows or may comprise a flexible diaphragm. The reservoir is compressed in response to the weight of an article received on the platform. Connected to the reservoir is a display means which is in fluid communication with said reservoir. The display means is most preferably in the form of a flexible transparent tube which displays the volume of fluid displaced from the reservoir in response to the weight of the article on the platform.

MORE DETAILED DESCRIPTION OF THE INVENTION

In a second preferred embodiment of the invention, the weighing scales employ a base and platform as before, but more particularly, the reservoir is in the form of a bellows, which are fitted within the base beneath the platform. The bellows are compressible and so when an article is placed on the platform they become compressed and fluid is displaced from the bellows to the display means as previously described. A linkage means is provided having a first end in contact with the platform and a second end acting upon the bellows. This contact transmits the weight of the article placed on the platform to the bellows and subsequently a displacement of fluid to the display means.

In a third preferred embodiment of the invention, the weighing scale again employs a base, a platform, a reservoir, a linkage means and a fluid display means. The reservoir has two walls, one being a fixed incompressible wall and the other being a compressible wall opposite that fixed wall. The compressible wall is in the form of a sealed diaphragm. The linkage means in this embodiment is positioned between the base and the reservoir. Again the linkage means has two ends, in this case one in contact with the platform and the other end acting upon the diaphragm. The diaphragm is compressed in response to the weight of an article on the platform and fluid is displaced from the reservoir to the fluid display means that is the transparent in the same manner as previously described.

It is, therefore, the principal object to provide weighing scales in the form of fluid scales incorporating a compressible reservoir in which the volume of fluid displaced from the reservoir in response to the weight of an article on the platform is shown visibly on a display means.

BRIEF DESCRIPTION OF THE DRAWING

FIG. 1 is a perspective view of the first embodiment of weighing scales in use;

FIG. 2 is a detailed perspective view of the encircled part of FIG. 1;

FIG. 3 and FIG. 4 show weighing scales of FIG. 1 in a storage condition;

FIG. 7A is a diagrammatic perspective view of part of weighing scales according to a second embodiment of the invention;

FIG. 7B is an enlarged perspective view of the printed scale and flexible tube of the weighing scales of FIG. 7A;

FIG. 8 is a diagrammatic exploded view of the weighing scales of FIG. 7A;

FIG. 9 is a perspective view showing the inside of a platform of the weighing scales of FIG. 7A;

FIG. 10 is a sectional view of a reservoir cover forming part of the weighing scales of FIG. 7A;

DESCRIPTION OF THE PREFERRED EMBODIMENTS

Figure 5:
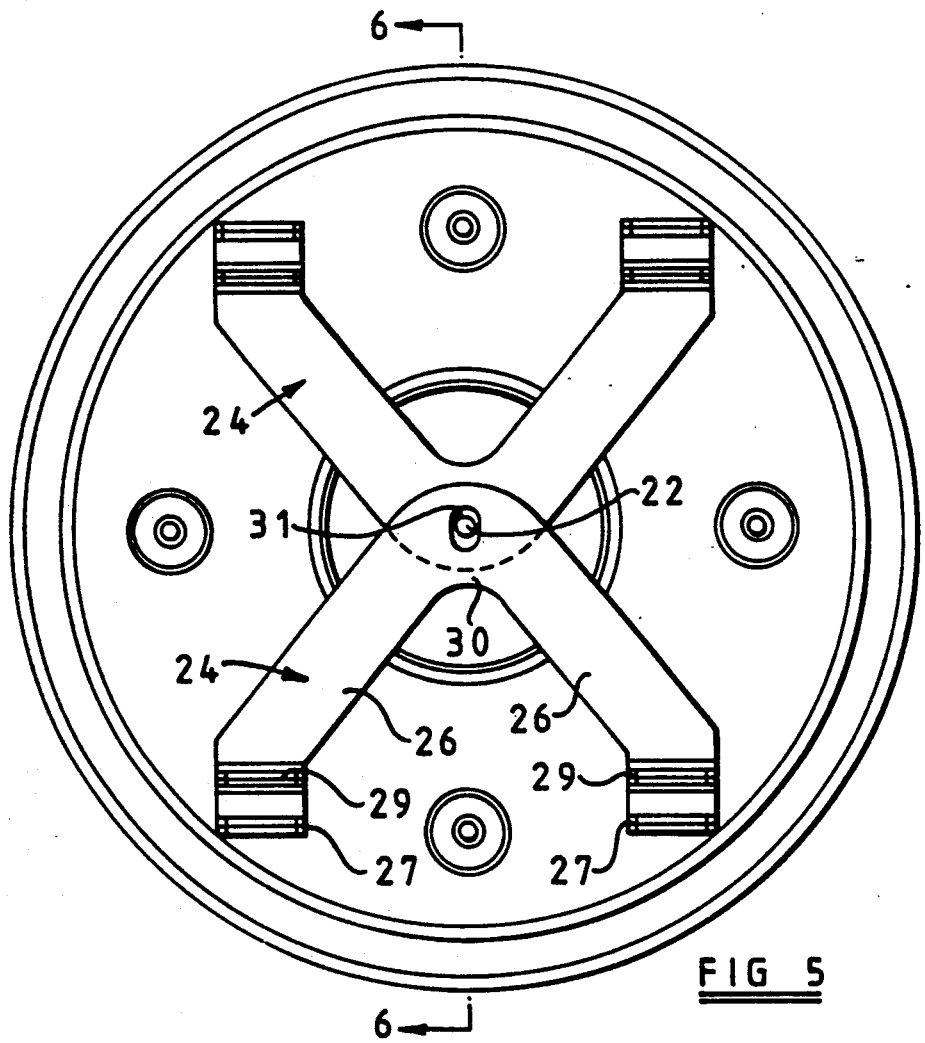
FIG. 5 is a plan sectional view through the platform of scales of FIG. 1.

Like characters of reference designate like parts in those figures of the drawings in which they occur.

In the drawings:

Referring firstly to FIGS. 1 and 2, a weighing scale generally indicated at 10 comprises a platform 11 on which an article or person to be weighed can be placed. From the platform, a flexible tube 12 can be seen to extend to an upright support where it is secured by means of clips 13. A scale 14 is secured adjacent the tube 12 or may form part of the upright support.

When a person or article is placed on the platform 11, fluid is displaced through the flexible tube 12 to a level which is encircled in FIG. 1 of the drawings and shown enlarged in FIG. 2. The fluid 15 may be water which may be coloured.

Alternatively, or in addition, a coloured or otherwise clearly visible float 16 may be allowed to settle on the top of the water or other fluid so as to provide a clear display. The scale 14 may have graduations or may be capable of having calibrations marked thereon in the course of use of the scale, for example for teaching.

An external slidable marker 16a or markers may be provided on the tube 12 to record the level reached by the float 16, or alternatively similar markers may be arranged to cooperate with the scale 14.

When not in use, the weighing scale 10 can be stored in the condition shown in FIGS. 3 and 4. The platform 11 can have the flexible tube 12 wrapped round it. The scale 14 may be flexible and may be rolled up in the manner shown in FIG. 4, stickers 17 or other suitable means being provided for securing the scale in place against an upright support.

However, it will be realised that the scale can be a permanent fitting and in this case the tube 12 may be wholly or partly replaced by a non-flexible tube which need not be straight or vertical in use. The device is therefore capable of being used as a novelty bathroom scale.

Figure 6:
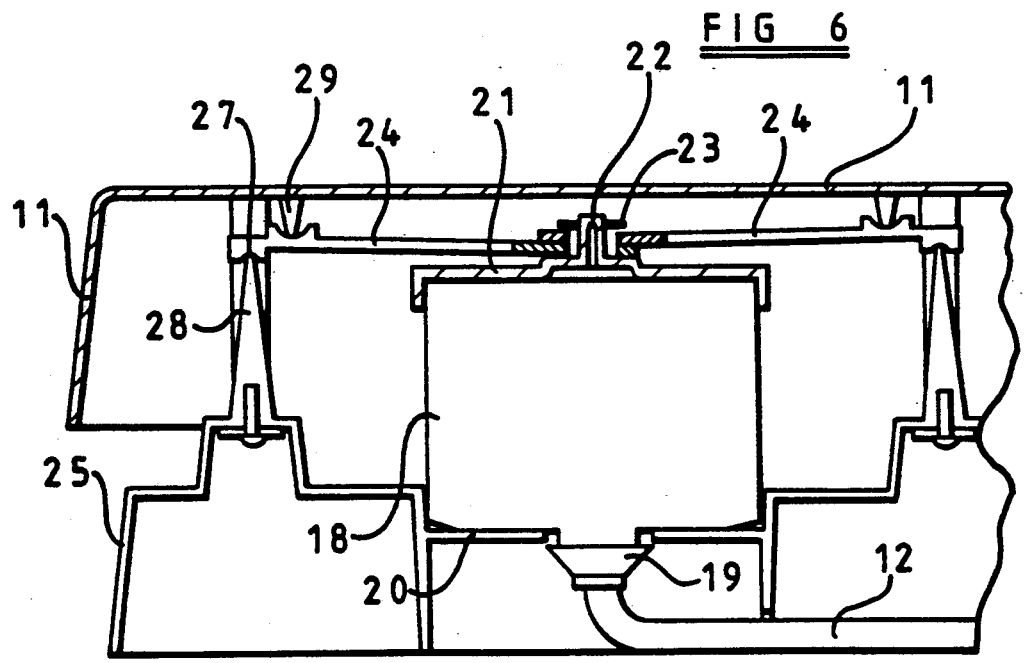
FIG. 6 is a transverse vertical sectional view on the line 6—6 of FIG. 5.
Figure 11:
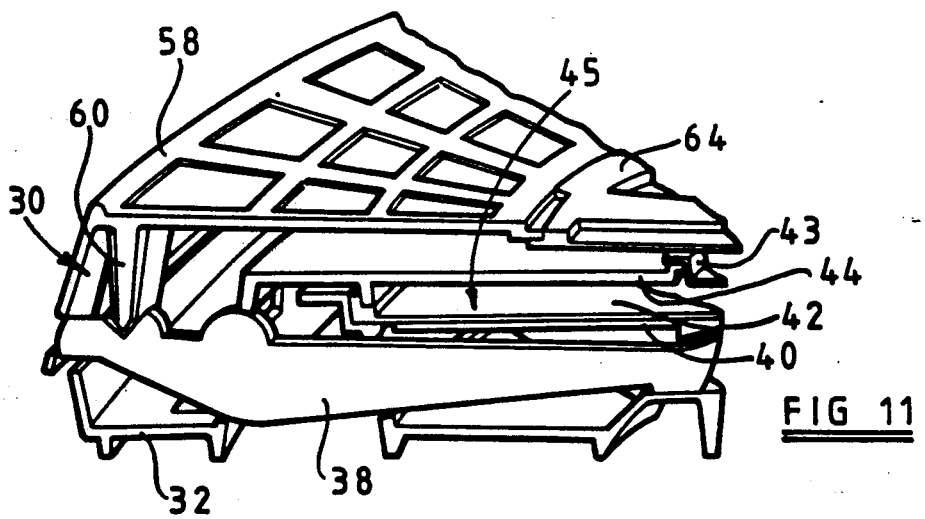
FIG. 11 is a cut-away view of part of the weighing scales of FIG. 7A, with the scales in an unloaded condition.
Figure 12:
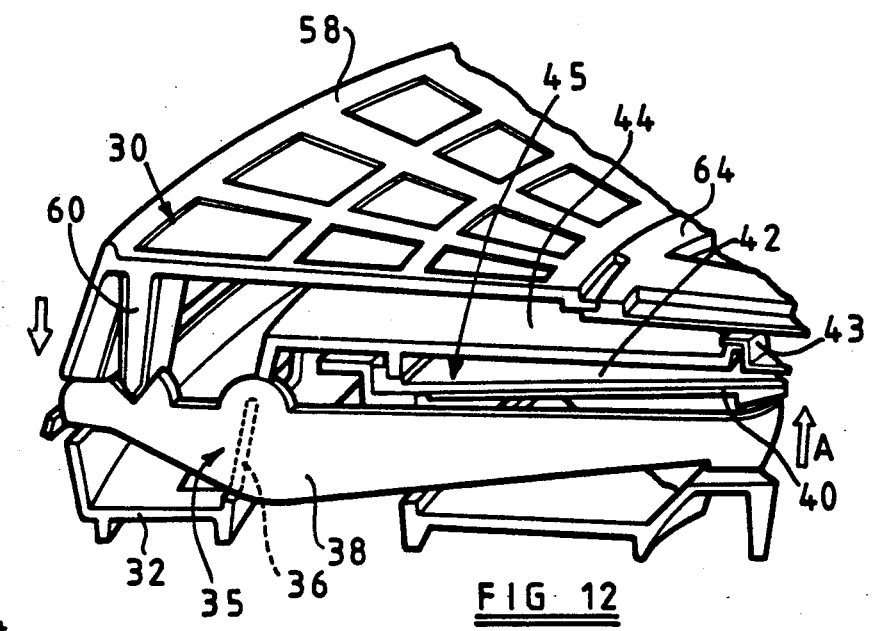
FIG. 12 is a similar view as that shown in FIG. 11, with the weighing scales in a loaded condition.
Figure 13:
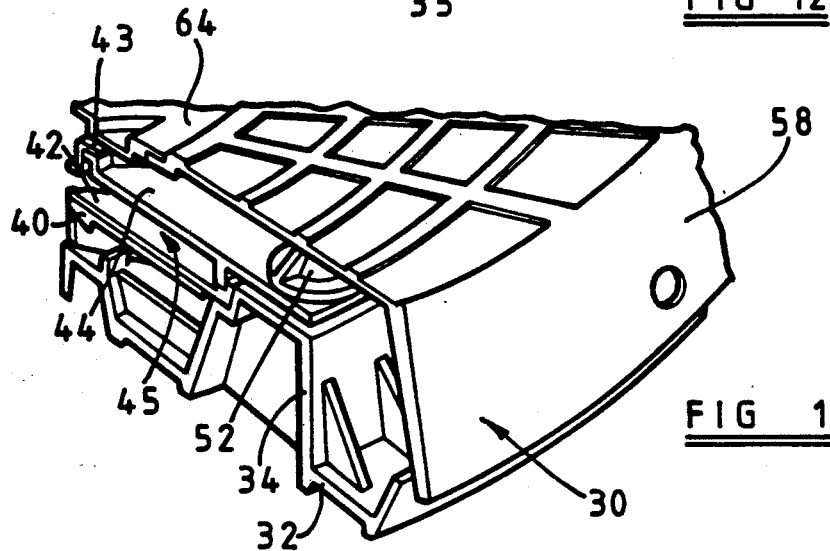
FIG. 13 is a cut away view of another portion of the weighing scales of FIG. 7A.

FIGS. 5 and 6 of the drawings illustrate the operation of the weight receiving platform 11. A fluid containing reservoir 18 is a flexible, fluid impermeable material and has an outlet 19 at the base which has the flexible tube 12 secured to it. The reservoir 18 is located between a lower support 20 and an upper pressure applying member 21. The pressure applying member 21 has location means 22 having a star-lock washer or similar retaining means 23 to retain a pair of wishbones 24, which are similar to each other and are disposed oppositely within an outer housing comprising a lower part 25 and an upper platform 11.

The wishbones 24 are more clearly seen in FIG. 5. Each has a pair of limbs 26 and is supported at a pair of aligned linear fulcra 27 from upright edges 28 mounted on the lower part 25 of the housing. Weight from the upper part 11 of the housing is transmitted to the wishbones through force transmitting edges 29 which are close to the fulcra 27 at the ends of the limbs 26 of the wishbone.

The two limbs 26 of the wishbone are linked in a central portion 30 which has an aperture of elongate form illustrated at 31 which receives the post 22 as a loose fit.

In use, weight exerted on the platform 11 acts through the four edges 29 disposed around the periphery of the platform 11 which tend to even out any uneven loading of the platform. The weight is exerted close to the respective fulcra 28, exerting a high moment. However, the length of the limbs 26 of the wishbones 24 means that the same moment, exerted on the cap 21 of the reservoir 18 transmits a much reduced force, proportional to the weight of the article or person on the platform 11.

It would of course be possible to arrange for the force exerted on the platform 11 to be transmitted directly to the reservoir 18 without interposing the wishbone mechanical advantage means. However, this would mean that a very large reservoir had to be provided together with an extensive tubular scale to accommodate large weight such as that of a person.

Turning now to FIGS. 7A to 13, the second embodiment of the invention will now be described in more detail.

FIGS. 7A, 7B and 8 show weighing scales generally designated 30 and which comprise a plastics moulded circular base 32 having an integral coaxial annular collar 34 which is formed with five equally angularly spaced slots 36 each of which receives a lever 38. The levers each pass through the collar 34 with each lever 38 pivoting about the lower edge of its respective slot 36 to form a main pivot 35 therefor.

A plunger 40 fits within the collar 34 over the radially inner ends of the levers. Directly above the plunger 40 is a rubber diaphragm 42 and reservoir cover 44. The rubber diaphragm 42 is sealed in place between the reservoir cover 44 and the collar 34. The reservoir cover 44 is of dish-like configuration with a flange 46 formed around the periphery thereof. Five equally spaced apertures 48 are formed in the flange 46 and a central aperture 50 is formed in the cover 44 being provided with a plug or bung 43. The cover 44 is secured to the collar 34 by five key fasteners 52, as shown in FIG. 8, which pass through the apertures 48 and engage correspondingly formed key holes 54 formed in the collar 34. The plunger 40 substantially covers the diaphragm 42 and the deformable reservoir 45 is formed between the diaphragm 42 and the cover 44. The reservoir is of low volume, normally 200 cc.

As can be seen in FIGS. 7A, 7B and 8 a transparent flexible tube 56 having an internal diameter of 2.8 mm extends from the reservoir cover 44 to an upright support where it is secured by clips, one example of which 53 is shown in FIG. 7B against a printed scale 55 from which measurements may be taken.

A generally circular platform 58 having an annular skirt is provided which has five integral downwardly projecting members 60, which co-operate with respective levers 38 pivotally mounted in the base 32 at points radially outward of the levers' pivot points (i.e. outward of the slots 36). A central aperture 62 with a lid 64 is also provided in the platform 58 to give access to the reservoir 45 for filling with water prior to use.

Prior to use the lid 64 and plug 43 are removed and the reservoir 45 is filled with water. The plug 43 and the lid 64 of the platform are replaced.

In use, an article to be weighed is placed on the platform 58. The downwardly projecting members 60 act upon the radially outward ends of the five levers 38 and pivot each lever about its pivot point 35 to cause the radially inward ends of the levers to move upwardly as shown by arrow A in FIG. 12 to contact the plunger 40 urging it upwards into contact with the diaphragm 42. The five levers 38 transmit the weight of the article evenly to the plunger 40. The effect of the levers 38 is to transmit a much reduced force on the diaphragm 42. The diaphragm 42 having moved upwards displaces water in the reservoir 45 which is then forced out through the transparent flexible tubing 56 to be displayed against the scale 55. When an equilibrium has been reached, the water moving up the tube 56 comes to a halt and at this point it is possible to take a measurement of the level of the water in the tube 56 against the printed scale 55 shown in FIG. 7B.

It will be appreciated that the difference in levels on the scale 55 between the initial and final readings reports a height of column proportional to the weight of the article placed on the platform. It is possible to add a dye to the water so that the displacement of the water along the tubing 56 can be more clearly seen.

Obviously the invention is susceptible to some change or alteration, and we therefore do not wish to confine the spirit and scope of the invention to the preferred embodiments shown in the drawings described herein.

What we claim is:

1. A weighing scale for determining a weight of an article placed thereupon comprising:
   a circular base;

an annular collar being integrally formed and coaxial with said circular base, said collar defining a recess and being formed with a plurality of equally angularly spaced slots;

a plurality of lever means being respectively received in said angularly spaced slots so as to project into said recess, each of said lever means adapted to pivot about a lower edge of its respective slot;

a plunger means received in said recess and contacting a radially inner end of said lever means;

a reservoir cover formed to cover said recess and adapted to be secured to said annular collar;

a diaphragm received in said recess and adapted to be sealed in place between said cover and said collar;

a platform contacting the radially outward ends of said lever means, said platform adapted to move relative to said base and said collar;

a deformable reservoir formed between said diaphragm and said cover, said deformable reservoir being compressible in response to said weight of said article on said platform and containing a displaceable fluid;

a display means in fluid communication with said deformable reservoir for displaying the volume of fluid displaced; and a recording means for temporarily recording the position of a meniscus of the fluid displaced from said reservoir;

whereby in response to the weight being placed on said platform, said platform is translated relative to said collar, said lever means pivots about the lower end of it respective slot, said plunger is translated within said recess, said deformable reservoir is compressed, and said fluid is displaced from said deformable reservoir to said display means.

2. Weighing scales as set forth in claim 1, wherein said recording means comprises a legend and a securing means for securing said legend against a support, said legend adapted to receive writing and adapted to roll up for portable use.

3. Weighing scales as set forth in claim 1, wherein said recording means comprises at least one slidable marker adapted for translational movement proximate said display means, said slidable marker recording the position of a meniscus of said displaced fluid.

* * * * *